United States Patent
Baldovino et al.

(10) Patent No.: US 10,272,886 B2
(45) Date of Patent: Apr. 30, 2019

(54) VEHICLE SENSOR SYSTEM

(71) Applicant: Ford Global Techologies, LLC, Dearborn, MI (US)

(72) Inventors: Segundo Baldovino, Novi, MI (US); Andre Sykula, Sterling Heights, MI (US); Venkatesh Krishnan, Canton, MI (US); Stephanie Bartol, Ferndale, MI (US); Joshua Norwood, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/699,248

(22) Filed: Sep. 8, 2017

(65) Prior Publication Data

US 2019/0077376 A1   Mar. 14, 2019

(51) Int. Cl.
| | |
|---|---|
| *B60S 1/48* | (2006.01) |
| *G01J 1/42* | (2006.01) |
| *B60S 1/50* | (2006.01) |
| *B60S 1/52* | (2006.01) |
| *B60R 11/04* | (2006.01) |

(Continued)

(52) U.S. Cl.
CPC .............. *B60S 1/481* (2013.01); *B60R 11/04* (2013.01); *B60S 1/50* (2013.01); *B60S 1/52* (2013.01); *B60S 1/54* (2013.01); *G01J 1/42* (2013.01); *G01S 7/497* (2013.01); *G01S 2007/4975* (2013.01)

(58) Field of Classification Search
USPC .......................................................... 701/36
See application file for complete search history.

(56) References Cited

U.S. PATENT DOCUMENTS 4,393,341 A * 7/1983 Byrne ..................... B60S 1/482
                                                       15/250.02
8,567,963 B1   10/2013 Criscuolo et al.
(Continued)

FOREIGN PATENT DOCUMENTS

DE   102014213282 A1   1/2016
DE   102016006039 A1   11/2016
(Continued)

OTHER PUBLICATIONS

Nissan Insider article, "The self-cleaning rear view camera that plays a very important role," http://nissaninsider.co.uk/the-self-cleaning-rear-view-camera-that-plays-a-very-important-role/ dated Jun. 14, 2017.

(Continued)

*Primary Examiner* — Tyler D Paige
(74) *Attorney, Agent, or Firm* — Frank A. MacKenzie; Bejin Bieneman PLC (57) ABSTRACT

A sensor system includes a base including first and second windows. The sensor system includes first and second optical sensors supported by the base and positioned to receive light through the first and second windows. The sensor system includes first and second nozzles directed at the first and second windows. The sensor system includes a manifold in fluid communication with the first and second nozzles. The sensor system includes a liquid reservoir in fluid communication with the manifold. The sensor system includes an air compressor in fluid communication with the manifold.

20 Claims, 4 Drawing Sheets

(51) Int. Cl.
  *B60S 1/54* (2006.01)
  *G01S 7/497* (2006.01)

(56) References Cited

U.S. PATENT DOCUMENTS

| | | | |
|---|---|---|---|
| 9,505,382 B2 | 11/2016 | Gokan | |
| 2003/0041897 A1* | 3/2003 | Lee | B60S 1/481 |
| | | | 137/59 |
| 2003/0041900 A1* | 3/2003 | Wojan | B60S 1/481 |
| | | | 137/79 |
| 2003/0042328 A1* | 3/2003 | Wojan | B60S 1/481 |
| | | | 239/284.1 |
| 2005/0200163 A1* | 9/2005 | Arnold, Jr. | B60J 1/02 |
| | | | 296/201 |
| 2006/0096050 A1* | 5/2006 | Simonette | B08B 3/024 |
| | | | 15/103 |
| 2007/0103780 A1* | 5/2007 | Cooper | B60R 1/0602 |
| | | | 359/509 |
| 2007/0128899 A1* | 6/2007 | Mayer | G06F 9/4406 |
| | | | 439/152 |
| 2013/0255024 A1* | 10/2013 | Kaminaga | B60S 1/52 |
| | | | 15/250.03 |
| 2016/0114768 A1* | 4/2016 | Matsuura | B60S 1/583 |
| | | | 296/146.2 |
| 2016/0244028 A1 | 8/2016 | Wakatsuki | |
| 2017/0151933 A1 | 6/2017 | Doorley et al. | |
| 2017/0259788 A1* | 9/2017 | Villa-Real | B60S 1/488 |

FOREIGN PATENT DOCUMENTS

| | | |
|---|---|---|
| DE | 102016008064 A1 | 12/2016 |
| WO | 2015071035 A1 | 5/2015 |

OTHER PUBLICATIONS

Thompson, "Google wants all its self-driving cars to clean themselves—here's why," dated May 5, 2016, 11.44 PM.

* cited by examiner

VEHICLE SENSOR SYSTEM

BACKGROUND

A vehicle may receive information from an optical sensor. The information from the optical sensor may be used to navigate the vehicle, e.g., to avoid vehicle collisions, maintain a lane of travel, etc. However, the optical sensor may be rendered wholly or partially inoperable, e.g., when a contaminant such as dirt, dust, water drops, etc., blocks a field of view of the sensor.

DETAILED DESCRIPTION

A sensor system includes a base including first and second windows. The sensor system includes first and second optical sensors supported by the base and positioned to receive light through the first and second windows. The sensor system includes first and second nozzles directed at the first and second windows. The sensor system includes a manifold in fluid communication with the first and second nozzles. The sensor system includes a liquid reservoir in fluid communication with the manifold. The sensor system includes an air compressor in fluid communication with the manifold.

The sensor system may include a valve between the first nozzle and the manifold.

The sensor system may include a computer programmed to actuate the liquid reservoir to provide liquid to the manifold and to actuate the air compressor to provide air to the manifold and to actuate the valve to an open position upon a determination that first window is contaminated.

The sensor system may include a check valve between the liquid reservoir and the manifold and positioned to permit fluid flow from the liquid reservoir to the manifold.

The sensor system may include a check valve between the air compressor and the manifold and positioned to permit fluid flow from the air compressor to the manifold.

The base may define a cavity and the air compressor may be disposed within the cavity.

The base may define a cavity and the optical sensors may be disposed within the cavity.

The base may include a vent.

The sensor system may include a computer programmed to actuate the air compressor to provide air to the manifold, and then to actuate the liquid reservoir to provide liquid to the manifold upon a determination that at least one of the windows is contaminated.

The sensor system may include a computer programmed to actuate the liquid reservoir to provide a first amount of liquid to the manifold, and then to actuate the liquid reservoir to provide a second amount of liquid to the manifold upon a determination that at least one of the windows is contaminated. The second amount may be greater than the first amount.

A vehicle includes a base including first and second windows and supported at a first location. The vehicle includes first and second optical sensors supported by the base and positioned to receive light through the first and second windows. The vehicle includes first and second nozzles directed at the first and second windows. The vehicle includes a manifold in fluid communication with the first and second nozzles. The vehicle includes a liquid reservoir supported at a second location spaced from the first location and in fluid communication with the manifold. The vehicle includes an air compressor in fluid communication with the manifold.

The vehicle may include an engine bay. The second location may be within the engine bay.

The vehicle may include a roof. The first location may be on the roof.

The liquid reservoir may include a first sensor configured to detect a first amount of liquid in the reservoir and a second sensor configured to detect a second amount of liquid in the liquid reservoir that is less than the first amount.

The vehicle may include a windshield and a third nozzle directed at the windshield and in fluid communication with the liquid reservoir.

The vehicle may include a computer programmed to actuate the liquid reservoir to selectively provide liquid to the first, second, and third nozzles.

The computer may be programmed to prioritize providing liquid to the first and second nozzles over providing liquid to the third nozzle upon a determination that an amount of liquid in the liquid reservoir is below a threshold.

The base may define a cavity and the air compressor may be disposed within the cavity.

The base may define a cavity and the manifold may be disposed within the cavity.

The vehicle may include a first valve between the manifold and the first nozzle and a second valve between the manifold and the second nozzle.

With reference to the Figures, a sensor system 20 for a vehicle 22 includes a base 24 including first and second windows 26a, 26b. The sensor system 20 includes first and second optical sensors 28a, 28b supported by the base 24 and positioned to receive light through the first and second windows 26a, 26b. The sensor system 20 includes first and second nozzles 30a, 30b directed at the first and second windows 26a, 26b. The sensor system 20 includes a manifold 32 in fluid communication with the first and second nozzles 30a, 30b. The sensor system 20 includes a liquid reservoir 34 in fluid communication with the manifold 32. The sensor system 20 includes an air compressor 36 in fluid communication with the manifold 32. The sensor system 20 protects the optical sensors 28 and maintains uncontaminated fields of view FV of the optical sensors 28.

Figure 2:
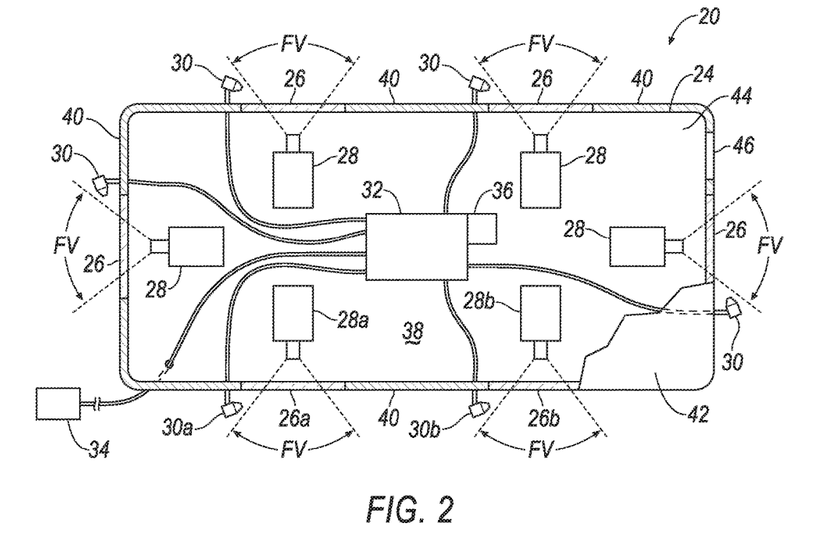
FIG. 2 is a top break away view of the example sensor system of FIG. 1.

The base 24 may define a cavity 38, as shown in FIG. 2. For example, the base 24 may include walls 40, a top panel 42, a bottom panel 44, etc., to enclose the cavity 38 and protect components therein. The cavity 38 may be partially or completely enclosed by the base 24.

The base 24 includes the windows 26, e.g., the first window 26a and the second window 26b. The windows 26 permit light to travel therethrough. Each of the windows 26 includes a transparent material that permits light to enter the cavity 38 while inhibiting other material, e.g., solid, liquid, or gas, from passing therethrough. For example, each window 26 may be a lens. The transparent material may be common, e.g., a single sheet of material, for more than one window 26. The transparent material may be glass, such as laminated glass, tempered glass, etc., or plastic such as Plexiglas, polycarbonate, etc., or any other suitable material.

The base 24 may include a vent 46. The vent 46 permits air to travel therethrough, e.g., to cool components within the cavity 38. The vent 46 may be located on one of the walls 40, the top panel 42, etc.

Figure 1:
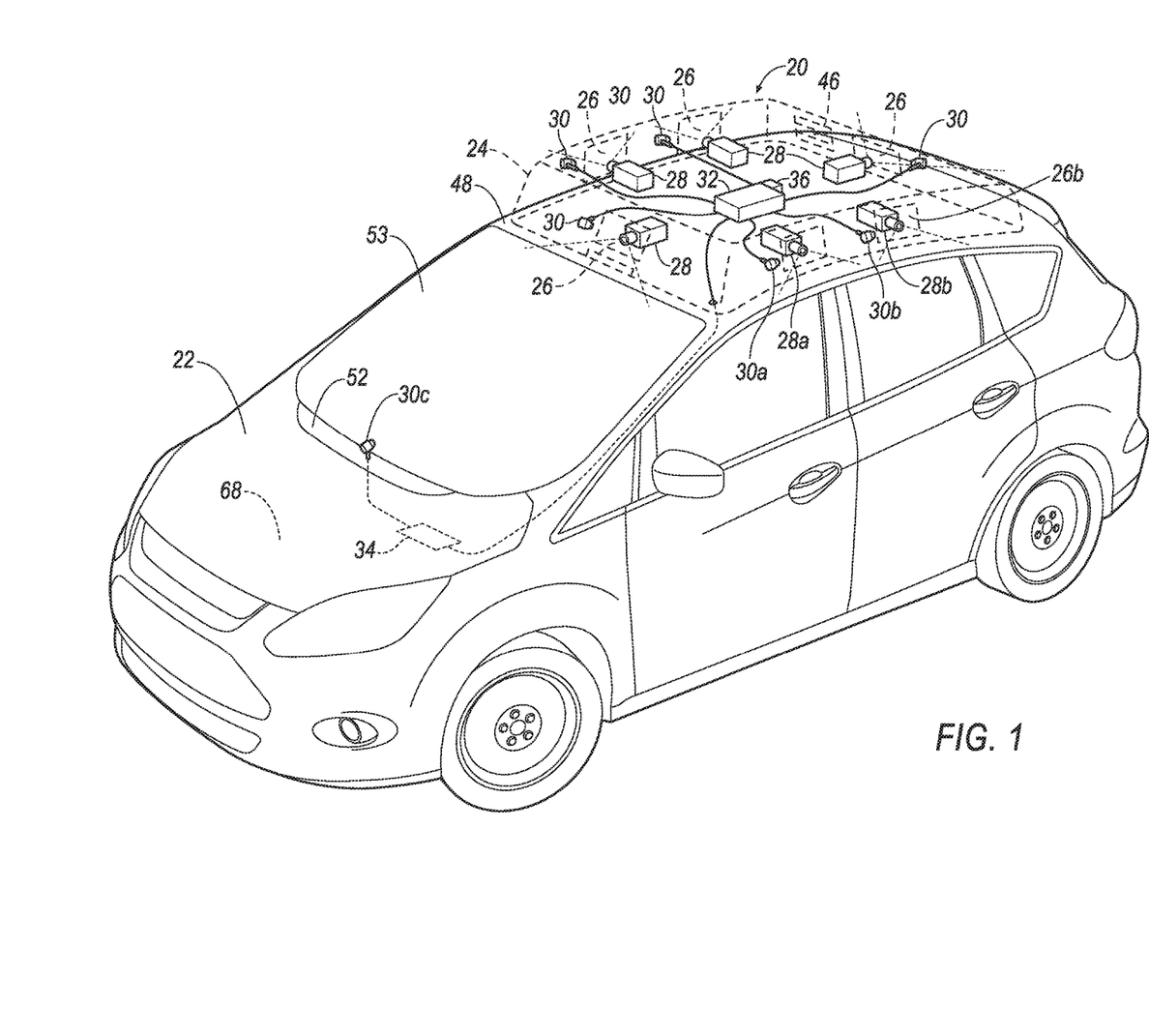
FIG. 1 is a perspective view of an example vehicle with an example sensor system.

The base 24 may be supported at a first location, e.g., by the vehicle 22. The first location may be on a roof 48 of the vehicle 22, as shown in FIG. 1.

Optical sensors 28, e.g., the first optical sensor 28a and the second optical sensor 28b, are positioned to receive light through windows 26. For example, the first optical sensor 28a may be positioned to receive light through the first window 26a. To put it another way, the first window 26a may be within the field of view FV of the first optical sensor 28a. Another of the optical sensors 28, e.g. the second optical sensor 28b, may be positioned to receive light through another of the windows 26, e.g., the second window 26b. To put it another way, the second window 26b may be within the field of view FV of the second optical sensor 28b.

The fields of view FV are areas from which light is detected by the optical sensors 28, as shown in FIG. 2. Light generated by, and/or reflected off, an object within the fields of view FV and towards the windows 26 is detectable by the optical sensors 28, provided such light is not blocked before reaching the optical sensors 28.

Each of the optical sensors 28 may be a scanning laser range finder, a light detection and ranging (LIDAR) device, an image processing sensor such as camera, or any other sensor that detects light. Each of the optical sensors 28 may generate data representing an image 50 captured by the optical sensor 28.

The optical sensors 28 are supported by the base 24. For example, each of the optical sensors 28 may be secured to the bottom panel 44, one of the walls 40, etc., e.g., with an adhesive, one or more fasteners, etc. The optical sensors 28 may be disposed within the cavity 38.

Figure 3:
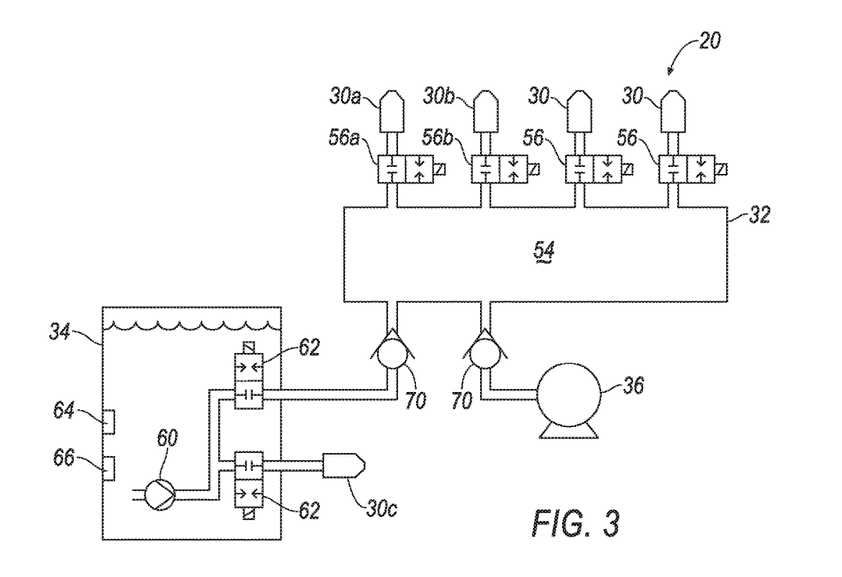
FIG. 3 is an illustration of a fluid schematic of the example sensor system of FIG. 1.

Nozzles 30, e.g., the first nozzle 30a, the second nozzle 30b, and a third nozzle 30c, receive fluid and spray such fluid in a certain direction, e.g., based on a position and orientation of each nozzle 30. Two or more of the nozzles 30 are directed, e.g., disposed at a certain position and orientation, to spray fluid on the windows 26, e.g., to clean the windows 26. For example, the first nozzle 30a is directed at the first window 26a, and the second nozzle 30b is directed at the second window 26b. One or more of the nozzles 30 may be directed at a surface of the vehicle 22 other than the windows 26. For example, the third nozzle 30c may be directed at a windshield 53 of the vehicle 22. One or more of the nozzles 30 may be supported by the base 24. For example, the first nozzle 30a and the second nozzle 30b may be secured to the walls 40 of the base 24. One or more of the nozzles 30 may be supported by the vehicle 22. For example, the third nozzle 30c may be secured to a cowl 52 of the vehicle 22.

The manifold 32 defines a chamber 54, as shown in FIG. 3. The manifold 32 is in fluid communication with two or more of the nozzles 30, e.g., with the first nozzle 30a and the second nozzle 30b via hoses, piping, etc., such that fluid may flow from the chamber 54 to the nozzles 30. The manifold 32 may be formed from metal, plastic, or any other suitable material. The manifold 32 may be disposed within the cavity 38.

Valves 56, e.g., a first valve 56a and a second valve 56b, may be located between the nozzles 30 and the manifold 32 to control fluid flow between the manifold 32 and the nozzles 30. For example, the first valve 56a may be located between the manifold 32 and the first nozzle 30a, and the second valve 56b may be located between the manifold 32 and the second nozzle 30b. Although shown in the Figures as having each nozzle 30 in fluid communication with an individual valve 56, it is to be understood that the valves 56 could be in fluid communication with multiple nozzles 30, e.g., one valve 56 may control fluid flow from the manifold 32 to multiple nozzles 30. The sensor system 20 may include any suitable number of valves 56.

The valves 56 are movable between an open position and a closed position. In the open position fluid is permitted to flow from the manifold 32 to the respective nozzle 30. In the closed position fluid is inhibited from flowing from the manifold 32 to the respective nozzle 30. For example, the valves 56 may be solenoid valves, butterfly valves, globe valves, gate valves, or any other suitable type of valve. The valves 56 may include electromechanical components for moving between the open and closed positions, e.g., in response to an instruction from a computer 58.

The air compressor 36 may include a motor, piston and cylinder, storage tank, valves, etc., for compressing and storing air under pressure. The air compressor 36 is in fluid communication with the manifold 32, e.g., via hoses, piping, etc., such that fluid may flow therebetween. The air compressor 36 may actuate to provide compressed air, e.g., in response to an instruction from the computer 58. The air compressor 36 may be supported by the base 24. The air compressor 36 may be disposed within the cavity 38, as shown in FIG. 2.

The liquid reservoir 34 stores liquid, such as a washing solution, for cleaning the windows 26. The liquid reservoir 34 is in fluid communication with the manifold 32, e.g., via hoses, piping, etc. The liquid reservoir 34 may be in fluid communication with other components, such as the third nozzle 30c. The liquid reservoir 34 may include one or more pumps 60, valves 62, etc., to control the liquid flow from the liquid reservoir 34 to the manifold 32, the third nozzle 30c, etc., e.g., in response to an instruction from the computer 58. The liquid reservoir 34 may be a component of the vehicle 22, e.g., a washing system for the windshield 53.

The pump 60 of the liquid reservoir 34 may actuate to an "on" state in which the pump 60 moves fluid. The pump 60 may actuate to an "off" state in which the pump 60 does not move fluid. The pump 60 may actuate between the "on" state and the "off" state in response to an instruction from the computer 58.

The valves 62 of the liquid reservoir 34 may be implemented as described above for the valves 56. Each of the valves 62 of the liquid reservoir 34 may control fluid flow from the pump 60. For example, one of the valves 62 of the liquid reservoir 34 may control fluid flow to the manifold 32, e.g., such valve 62 may be located between the pump 60 and the manifold 32. Another of the valves 62 may control fluid flow to the third nozzle 30c, e.g., such valve 62 may be located between the pump 60 and the third nozzle 30c. Although shown as part of the liquid reservoir 34, it is to be understood that the valves 62 may be located spaced from the liquid reservoir 34, e.g., between the liquid reservoir 34 and the manifold 32 and between the liquid reservoir 34 and the third nozzle 30c.

The liquid reservoir 34 may include a first sensor 64 configured to detect a first amount of liquid in the reservoir and a second sensor 66 configured to detect a second amount of liquid in the liquid reservoir 34 that is less than the first amount. For example, the first sensor 64 may be above the second sensor 66. The sensors 64, 66 may be float sensors, pressure sensors, or any other sensor capable of detecting fluid level.

The liquid reservoir 34 may be supported at a second location spaced from the first location. For example, the second location may be supported within an engine bay 68 of the vehicle 22, as shown in FIG. 1.

The sensor system 20 may include one or more check valves 70, as shown in FIG. 3. Each of the check valves 70 allows fluid flow in one direction and inhibits fluid flow in an opposite direction. For example, the check valves 70 may be ball check valves, diaphragm check valves, swing check valves, lift-check valves, etc.

One of the check valves 70 may be located between the air compressor 36 and the manifold 32. Such check valve 70 may be positioned to permit fluid flow from the air compressor 36 to the manifold 32, and to inhibit fluid flow from the manifold 32 to the air compressor 36.

Another check valve 70 may be located between the liquid reservoir 34 and the manifold 32. Such check valve 70 may be positioned to permit fluid flow from the liquid reservoir 34 to the manifold 32, and to inhibit fluid flow from the manifold 32 to the air compressor 36.

Figure 4:
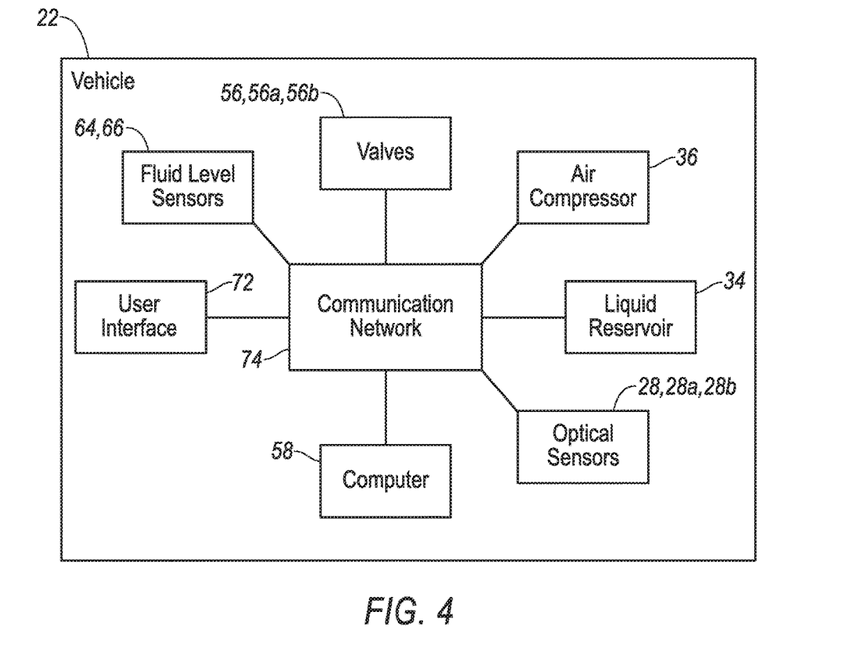
FIG. 4 is a block diagram of the example vehicle of FIG. 1.

The vehicle 22, shown in FIGS. 1 and 4, may be any passenger or commercial automobile such as a car, a truck, a sport utility vehicle, a crossover vehicle, a van, a minivan, a taxi, a bus, etc.

The vehicle 22 may operate in an autonomous mode, a semi-autonomous mode, or a non-autonomous mode. For purposes of this disclosure, an autonomous mode is defined as one in which each of a vehicle propulsion, braking, and steering are controlled by the computer 58; in a semi-autonomous mode the computer 58 controls one or two of the vehicle propulsion, braking, and steering; in a non-autonomous mode, a human operator controls the vehicle propulsion, braking, and steering.

The vehicle 22 may include the engine bay 68. The engine bay 68 houses vehicle 22 components, e.g., an engine, radiator, air heating and cooling systems, etc. It is understood that in the case of the vehicle 22 being an electric vehicle, i.e., having no engine, the engine bay 68 may house vehicle 22 components other than the engine.

The vehicle 22 may include the roof 48. The roof 48 covers a top of a passenger cabin of the vehicle 22. The roof 48 may be made of sheet metal, carbon fiber, or any other suitable material.

The vehicle 22 may include the windshield 53. The windshield 53 may be formed of glass, plastic or other suitable transparent material.

The vehicle 22 may include the third nozzle 30c. The third nozzle 30c may be directed at the windshield 53. The third nozzle 30c may be in fluid communication with the liquid reservoir 34, e.g., via hoses, piping, etc., such that the liquid reservoir 34 may provide fluid to the third nozzle 30c to clean the windshield 53.

The vehicle 22 may include a user interface 72, as shown in FIG. 4. The user interface 72 presents information to and receives information from an occupant of the vehicle 22. The user interface 72 may be located, e.g., on an instrument panel in the passenger cabin of the vehicle 22, or wherever may be readily seen by the occupant. The user interface 72 may include dials, digital readouts, screens such as a touch-sensitive display screen, speakers, and so on for providing information to the occupant, e.g., human-machine interface (HMI) elements. The user interface 72 may include buttons, knobs, keypads, microphone, and so on for receiving information from the occupant.

The vehicle 22 may include an in-vehicle communication network 74. The in-vehicle communication network 74 includes hardware, such as a communication bus, for facilitating communication among sensor system 20 and vehicle 22 components. The in-vehicle communication network 74 may facilitate wired or wireless communication among the vehicle 22 and sensor system 20 components in accordance with a number of communication protocols such as controller area network (CAN), Ethernet, WiFi, Local Interconnect Network (LIN), and/or other wired or wireless mechanisms.

The computer 58 may be a microprocessor-based computer 58 implemented via circuits, chips, or other electronic components. For example, the computer 58 may include a processor, a memory, etc. The memory of the computer 58 may include memory for storing programming instructions executable by the processor as well as for electronically storing data and/or databases. The computer 58 is generally configured for communications with the sensor system 20 and vehicle 22 components, on a controller area network (CAN) bus, e.g., the in-vehicle communication network 74, and for using other wired or wireless protocols to communicate with devices outside the vehicle 22, e.g., Bluetooth®, IEEE 802.11 (colloquially referred to as WiFi), satellite telecommunication protocols, and cellular protocols such as 3G, LTE, etc. Via the in-vehicle communication network 74 the computer 58 may transmit messages, information, data, etc., to various devices and/or receive messages, information, data, etc., from the various devices. Although the computer 58 is shown as a component of the vehicle 22, it is to be understood that the computer 58 could be a component of the sensor system 20, e.g., in communication with the sensor system 20 components and supported by the base 24. Although one computer 58 is shown in FIG. 4 for ease of illustration, it is to be understood that the computer 58 could include, and various operations described herein could be carried out by, one or more computing devices.

The computer 58 may be programmed to selectively actuate the valves 56 between the manifold 32 and the nozzles 30. For example, the computer 58 may transmit an instruction to one or more of the valves 56 between the manifold 32 and the nozzles 30 via the in-vehicle communication network 74. The instruction to one or more of the valves 56 may instruct such valves 56 to the open position or to the closed position. For example, the computer 58 may transmit the instruction to a specific valve 56, e.g., to the first valve 56a, to the second valve 56b, etc. The computer 58 may transmit the instruction to actuate the one or more of valves 56, e.g., the first valve 56a, to the open position upon a determination that one or more of the windows 26, e.g., the first window 26a, are contaminated. The computer 58 may determine that one or more of the windows 26 are contaminated based on information from one or more of the optical sensors 28.

Figure 5:
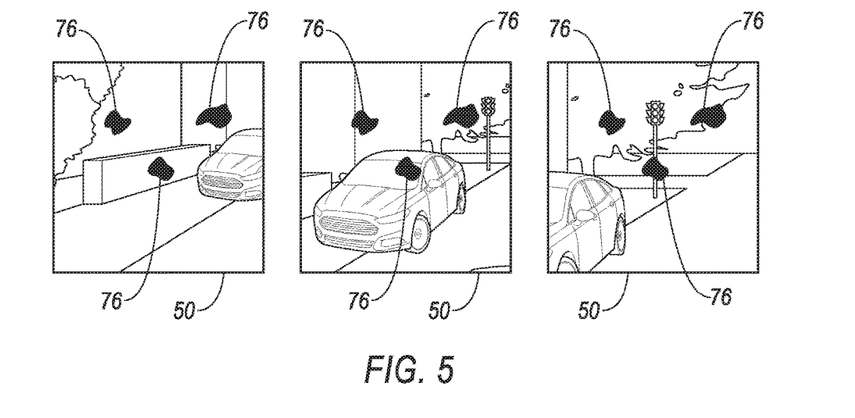
FIG. 5 is an illustration of example images captured by the example sensor system of FIG. 1.

For example, the computer 58 may compare images 50, shown in FIG. 5, received from one of the optical sensors 28, e.g., the first optical sensor 28a, with each other and identify an artifact 76 that is consistent among the images 50. For example, dirt, dust, water, etc., on the first window 26a will appear in a consistent location on the images 50 received from the first optical sensor 28a, while a remainder of the image 50 will change. Upon identification of a threshold amount, e.g., a number, a total area, etc., of artifacts 76 the computer 58 may determine the first window 26a is contaminated. The area of the artifacts 76 may be compared to a threshold area, e.g., 5 percent of the field of view FV. The number of artifacts 76 may be compared to a threshold amount, e.g., 10 artifacts 76. When the area and/or number of artifacts 76 is greater than the threshold area and/or threshold amount, the computer 58 may determine the first window 26a is contaminated.

For example, the computer 58 may identify the images 50 received from one or more of the optical sensors 28, e.g., the first optical sensor 28a, as being of low quality, e.g., a low resolution resulting from the contamination of the first window 26a interfering with focusing light on the first optical sensor 28a. The computer 58 may identify a quality of the image 50, e.g. an image resolution. The computer 58 may compare the quality of the image 50 with a quality threshold e.g., a threshold image resolution value. When the quality of the image 50 is less than the quality threshold the computer 58 may determine the first window 26a is contaminated.

For example, the computer 58 may determine one or more windows 26 are contaminated based on a brightness comparison among images 50 received from multiple optical sensors 28. For example, the computer 58 may determine that the first window 26a is contaminated when a brightness of an image 50, e.g., an average brightness of a total area of the image 50, received from the first optical sensor 28a is a threshold amount less than a brightness of an image 50 received from the second optical sensor 28b positioned to receive light from the second window 26b.

For example, the computer 58 may identify liquid drops on one of the windows 26 in one of the images 50 received from the optical sensor 28 positioned to receive light from such window 26, e.g., based on a size, color, etc., of the artifacts 76, e.g., using image 50 recognition techniques.

Other techniques may be used to determine that one or more of the windows 26 are contaminated.

The computer 58 may determine whether each individual window 26 is contaminated, e.g., based on information from one of the optical sensors 28 positioned to receive light from the relative one of the windows 26. For example, the computer 58 may determine whether the first window 26a is contaminated based on information from the first optical sensor 28a, whether the second window 26b is contaminated based on information from the second optical sensor 28b, etc. Such determinations may be made by the computer 58 as described herein.

The computer 58 may be programmed to actuate the air compressor 36 to provide air to the manifold 32. For example, the computer 58 may transmit an instruction to the air compressor 36 via the in-vehicle communication network 74. The instruction to the air compressor 36 may instruct the air compressor 36 to provide air, e.g., to open the valve of the air compressor 36, to operate the motor of the air compressor 36, to operate the piston and cylinder of the air compressor 36, etc.

The computer 58 may be programmed to provide air to one or more of the nozzles 30, e.g., to clean one or more of the windows 26. For example, the computer 58 may actuate the air compressor 36 to provide air to the manifold 32, and actuate one or more of the valves 56 between the manifold 32 and the nozzles 30 to an open position, e.g., as described herein.

The computer 58 may be programmed to provide air to one or more of the nozzles 30, e.g., the first nozzle 30a, upon the determination that one of the windows 26, e.g., the first window 26a, is contaminated. For example, upon the determination that the first window 26a is contaminated, the computer 58 may instruct the first valve 56a to the open position and may actuate the air compressor 36 to provide air to the manifold 32. Additionally, the computer 58 may provide air to one or more of the nozzles 30 after providing liquid to the manifold 32, e.g., to dry the one or more windows 26.

The computer 58 may be programmed to actuate the liquid reservoir 34 to provide liquid to the manifold 32, e.g., when providing air to the nozzles 30 is insufficient to clean the one or more windows 26. For example, the computer 58 may transmit an instruction to the liquid reservoir 34 via the in-vehicle communication network 74. The instruction to the liquid reservoir 34 may instruct the pump 60 of the liquid reservoir 34 to the "on" state and the valve 62 between the pump 60 and the manifold 32 to the open position.

The computer 58 may be programmed to actuate the liquid reservoir 34 to provide a first amount of liquid, e.g., 10 milliliters, to the manifold 32, e.g., to clean one or more of the windows 26. For example, the computer 58 may first instruct the pump 60 of the liquid reservoir 34 to the "on" state and the valve 62 between the pump 60 and the manifold 32 to the open position. Then, after a first amount to time, the computer 58 may instruct the pump 60 of the liquid reservoir 34 to the "off" state. The first amount of time may be based on a flow rate of the fluid through the pump 60. For example, the first amount of time may be determined by dividing the first amount of liquid by the flow rate of the pump 60.

The computer 58 may be programmed to actuate the liquid reservoir 34 to provide the first amount of liquid upon a determination that at least one of the windows 26 is contaminated, as described herein. The determination may be made after the computer 58 has actuated the air compressor 36 to provide the air. For example, the one or more windows 26 may still be contaminated after actuating the air compressor 36 to provide the air. In such situation, providing the first amount of liquid may clean the one or more windows 26, e.g., the liquid may remove dirt or other contaminates that were not removed with the air.

The computer 58 may be programmed to actuate the liquid reservoir 34 to provide a second amount of liquid, e.g., 15 milliliters, to the manifold 32, e.g., after an attempt to clean the one or more windows 26 with the first amount of liquid. The second amount of fluid may be greater than the first amount of fluid. For example, the computer 58 may first instruct the pump 60 of the liquid reservoir 34 to the "on" state and the valve 62 between the pump 60 and the manifold 32 to the open position. Then, after a second amount to time, the computer 58 may instruct the pump 60 of the liquid reservoir 34 to the "off" state. The second amount of time may be based on the flow rate of the fluid through the pump 60. For example, the second amount of time may be determined by dividing the second amount of liquid by the flow rate of the pump 60.

The computer 58 may be programmed to actuate the liquid reservoir 34 to provide the second amount of liquid upon a determination that at least one of the windows 26 is contaminated, as described herein. The determination may be made after the computer 58 has actuated the liquid reservoir 34 to provide the first amount of fluid. For example, the one or more windows 26 may still be contaminated after actuating the liquid reservoir 34 to provide the first amount of liquid. In such situation, providing the second amount of liquid may clean the one or more windows 26, e.g., the greater amount of liquid of the second amount may remove dirt or other contaminates that were not removed with the lesser amount of liquid of the first amount.

The computer 58 may be programmed to actuate the liquid reservoir 34 and/or the valves 56 to selectively provide liquid to the first, second, and third nozzle 30a, 30b, 30c. For example, to provide liquid to the first nozzle 30a, the computer 58 may transmit an instruction to the liquid reservoir 34 instructing the pump 60 to the "on" state and the valve 62 between the pump 60 and the manifold 32 to the open position, and transmit an instruction to the first valve 56*a* instructing actuation to the open position. For example, to provide liquid to the second nozzle 30*b*, the computer 58 may transmit an instruction to the liquid reservoir 34 instructing the pump 60 to the "on" state and the valve 62 between the pump 60 and the manifold 32 to the open position, and transmit an instruction to the second valve 56*b* instructing actuation to the open position. For example, to provide liquid to the third nozzle 30*c* the computer 58 may transmit an instruction to the liquid reservoir 34 instructing the pump 60 to the "on" state and the valve 62 between the pump 60 and the third nozzle 30*c* to the open position.

The computer 58 may be programmed to provide fluid to the third nozzle 30*c* upon receipt of a message indicating a user input to the user interface 72. For example, the user interface 72 may transmit a message in response to receiving a user input, the message indicating the user input and transmitted to the computer 58 via the in-vehicle communication network 74. Upon receipt of such message, the computer 58 may transmit the instruction to the liquid reservoir 34 instructing the pump 60 to the "on" state and the valve 62 between the pump 60 and the third nozzle 30*c* to the open position.

The computer 58 may be programmed to actuate the air compressor 36 to provide air to the manifold 32, and then to actuate the liquid reservoir 34 to provide liquid to the manifold 32 upon a determination that at least one of the windows 26 is contaminated, as described herein.

The computer 58 may be programmed to identify an amount of liquid in the liquid reservoir 34. For example, the computer 58 may identify a first amount of liquid in the liquid reservoir 34 based on information received via the in-vehicle communication network 74 from the first sensor 64 of the liquid reservoir 34. For example, the computer 58 may identify a second amount of liquid in the liquid reservoir 34 based on information received via the in-vehicle communication network 74 from the second sensor 66 of the liquid reservoir 34. Other devices, techniques, etc., may be used by the computer 58 to identify the amount of liquid in the liquid reservoir 34.

The computer 58 may be programmed to prioritize providing liquid to the first and second nozzles 30*a*, 30*b* over providing liquid to the third nozzle 30*c* upon a determination that an amount of liquid in the liquid reservoir 34 is below a threshold. The computer 58 may be programmed to make such determination based on information received from the first sensor 64 and/or the second sensor 66 of the liquid reservoir 34. For example, upon identification of the second amount of liquid in the liquid reservoir 34, the computer 58 may refrain from providing liquid to the third nozzle 30*c*.

Figure 6:
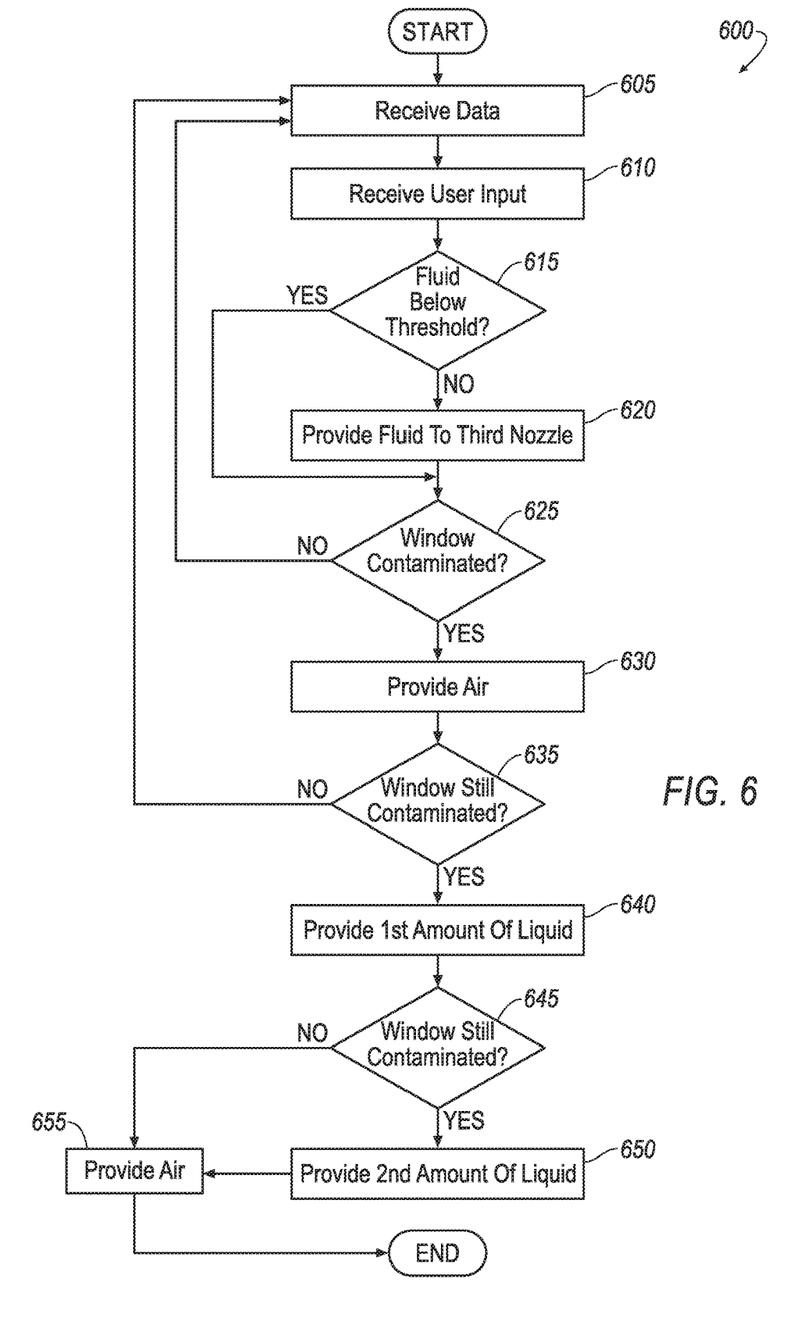
FIG. 6 is a process for operating the example sensor system of FIG. 1.

FIG. 6 is a process flow diagram illustrating an exemplary process 600 for operating the sensor system 20. The process 600 begins in a block 605 in which the computer 58 receives information from the optical sensors 28, the sensors 64, 66 of the liquid reservoir 34, etc., e.g., via the in-vehicle communication network 74.

At a block 610, the computer 58 receives a message from the user interface 72 indicating a user input to the user interface 72, e.g., via the in-vehicle communication network 7468.

Next, at a block 615 the computer 58 determines whether the amount of liquid in the liquid reservoir 34 is below the threshold. For example, the computer 58 may determine the liquid is below the threshold based on the identification that the amount of liquid is the second amount, e.g. based on information from the second sensor 64. Upon a determination that the liquid level is not below the threshold the process 600 moves to the block 620. Upon a determination that the liquid level is below the threshold the process 600 moves to a block 625.

At the block 620 the computer 58 actuates the liquid reservoir 34 to provide fluid to third nozzle 30*c*, as described herein.

At the block 625 the computer 58 determines whether one or more of the windows 26 is contaminated, as described herein. Upon a determination that one or more of the windows 26 is contaminated the process 600 moves to a block 630. Upon a determination that none of the windows 26 are contaminated the process returns to the block 605.

At the block 630, the computer 58 actuates the air compressor 36 and the valves 56 to provide air to the one or more contaminated windows 26, as described herein. For example, if the first window 26*a* was determined to be contaminated in the block 625, then the computer 58 actuates the air compressor 36 and the first valve 56*a* to provide air to the first window 26*a*, as described herein.

Next, at a block 635, the computer 58 determines whether the one or more windows 26 provided with air in the block 630 are still contaminated, as described herein. Upon a determination that such windows 26 are contaminated the process 600 moves to a block 640. Upon a determination that such windows 26 are not contaminated, the process 600 returns to the block 605.

At the block 640, the computer 58 actuates the liquid reservoir 34 and the valves 56 to provide the first amount of liquid to the one or more contaminated windows 26, as described herein. For example, if the first window 26*a* was determined to be contaminated in the block 635, then the computer 58 actuates the liquid reservoir 34 and the first valve 56*a* to provide the first amount of liquid to the first window 26*a*, as described herein.

Next, at a block 645, the computer 58 determines whether the one or more windows 26 provided with the first amount of liquid in the block 640 are still contaminated, as described herein. Upon a determination that such windows 26 are contaminated the process 600 moves to a block 650. Upon a determination that such windows 26 are not contaminated, the process 600 moves to a block 655.

At the block 650, the computer 58 actuates the liquid reservoir 34 and the valves 56 to provide the second amount of liquid to the one or more contaminated windows 26, as described herein. For example, if the first window 26*a* was determined to be contaminated in the block 645, then the computer 58 actuates the liquid reservoir 34 and the first valve 56*a* to provide the second amount of liquid to the first window 26*a*, as described herein.

Next, at the block 655, the computer 58 actuates the air compressor 36 and the valves 56 to provide air to the one or more windows 26 provided with liquid, as described herein. For example, if the first window 26*a* was provided with liquid in the block 640, then the computer 58 actuates the air compressor 36 and the first valve 56*a* to provide air to the first window 26*a*, as described herein.

After the block 655 the process 600 may end. Alternately, the process 600 may return to the block 605.

As used herein a computing device, e.g., a computer, includes a processor and a memory. The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor can receive the data and execute the processes described herein.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors. The memory may store program instruction executable by the processor to perform the processes described herein.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The phrase "based on" encompasses being partly or entirely based on.

The adjectives "first" and "second" are used throughout this document as identifiers and are not intended to signify importance or order.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor system comprising:
a base including first and second windows;
first and second optical sensors supported by the base and positioned to receive light through the first and second windows;
first and second nozzles directed at the first and second windows;
a manifold in fluid communication with the first and second nozzles;
a liquid reservoir in fluid communication with the manifold; and
an air compressor in fluid communication with the manifold.

2. The sensor system of claim 1, further comprising a valve between the first nozzle and the manifold.

3. The sensor system of claim 2, further comprising a computer programmed to actuate the liquid reservoir to provide liquid to the manifold and the air compressor to provide air to the manifold and to actuate the valve to an open position upon a determination that first window is contaminated.

4. The sensor system of claim 1, further comprising a check valve between the liquid reservoir and the manifold and positioned to permit fluid flow from the liquid reservoir to the manifold.

5. The sensor system of claim 1, further comprising a check valve between the air compressor and the manifold and positioned to permit fluid flow from the air compressor to the manifold.

6. The sensor system of claim 1, wherein the base defines a cavity and the air compressor is disposed within the cavity.

7. The sensor system of claim 1, where the base defines a cavity and the optical sensors are disposed within the cavity.

8. The sensor system of claim 1, wherein the base includes a vent.

9. The sensor system of claim 1, further comprising a computer programmed to actuate the air compressor to provide air to the manifold, and then to actuate the liquid reservoir to provide liquid to the manifold upon a determination that at least one of the windows is contaminated.

10. The sensor system of claim 1, further comprising a computer programmed to actuate the liquid reservoir to provide a first amount of liquid to the manifold, and then to actuate the liquid reservoir to provide a second amount of liquid to the manifold upon a determination that at least one of the windows is contaminated, wherein the second amount is greater than the first amount.

11. A vehicle comprising:
a base including first and second windows and supported at a first location;
first and second optical sensors supported by the base and positioned to receive light through the first and second windows;
first and second nozzles directed at the first and second windows;
a manifold in fluid communication with the first and second nozzles;
a liquid reservoir supported at a second location spaced from the first location and in fluid communication with the manifold; and
an air compressor in fluid communication with the manifold.

12. The vehicle of claim 11, further comprising an engine bay, wherein the second location is within the engine bay.

13. The vehicle of claim 11, further comprising a roof, wherein the first location is on the roof.

14. The vehicle of claim 11, wherein the liquid reservoir includes a first sensor configured to detect a first amount of liquid in the reservoir and a second sensor configured to detect a second amount of liquid in the liquid reservoir that is less than the first amount.

15. The vehicle of claim 11, further comprising a windshield and a third nozzle directed at the windshield and in fluid communication with the liquid reservoir.

16. The vehicle of claim 15, further comprising a computer programmed to actuate the liquid reservoir to selectively provide liquid to the first, second, and third nozzles.

17. The vehicle of claim 16, wherein the computer is programmed to prioritize providing liquid to the first and second nozzles over providing liquid to the third nozzle upon a determination that an amount of liquid in the liquid reservoir is below a threshold.

18. The vehicle of claim 11, where in the base defines a cavity and the air compressor is disposed within the cavity.

19. The vehicle of claim 11, where in the base defines a cavity and the manifold is disposed within the cavity.

20. The vehicle of claim 11, further comprising a first valve between the manifold and the first nozzle and a second valve between the manifold and the second nozzle.

* * * * *